US009928161B1

(12) United States Patent
Costello et al.

(10) Patent No.: US 9,928,161 B1
(45) Date of Patent: Mar. 27, 2018

(54) AUTOMATED QUALITY ASSURANCE TESTING OF BROWSER-BASED APPLICATIONS

(71) Applicant: FMR LLC, Boston, MA (US)

(72) Inventors: Robert Costello, Morrisville, NC (US); Lafayette Wallis Alves, Cary, NC (US); Manisha Babbar, Nashua, NH (US); Abhisek Dey, Cary, NC (US); Sadasiva Lingala, Nashua, NH (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/260,247

(22) Filed: Sep. 8, 2016

(51) Int. Cl.
*G06F 9/44* (2006.01)
*G06F 11/36* (2006.01)

(52) U.S. Cl.
CPC .................. *G06F 11/3688* (2013.01)

(58) Field of Classification Search
CPC ................................................ G06F 11/3688
USPC ........................................................ 717/127
See application file for complete search history.

(56) References Cited

U.S. PATENT DOCUMENTS

| 7,421,683 | B2* | 9/2008 | Robertson | G06F 11/3696 714/E11.207 |
| 2012/0246619 | A1* | 9/2012 | Thirumalai | G06F 11/3664 717/124 |
| 2014/0136944 | A1* | 5/2014 | Harris | G06F 17/211 715/234 |

* cited by examiner

Primary Examiner — Evral E Bodden
(74) Attorney, Agent, or Firm — Proskauer Rose LLP (57) ABSTRACT

Methods and apparatuses are described for intelligent automation of computer software test scripts and code requirements. A server generates a baseline test script for a plurality of browser-based applications with a sequence of action steps having one or more empty user interface component values. The server performs a first execution of the baseline test script against each of the browser-based applications to extract one or more expected values associated with user interface components that correspond to the empty user interface component values, and stores the expected values. The server performs a second execution of the baseline test script against the browser-based applications to extract one or more actual values associated with user interface components that correspond to the empty user interface component values. The server compares the actual values against the expected values, and if the values do not match, the server generates a message indicating a test failure.

19 Claims, 7 Drawing Sheets

| Test Step | Enabled? | Description | Action | Action Data |
|---|---|---|---|---|
| TS001 | Y | Login to myStreetscape application | LoginUser | Application=myStreetscape<br>Environment=FIX<br>PortalID=&PortalID |
| TS002 | Y | Wait for application to load | WaitFor | Seconds=10 |
| TS003 | Y | Verify style of logo | VerifyStyle | ObjectName=mySSLogo<br>font-family=*<br>font-size=*<br>font-style=*<br>color=* |
| TS004 | Y | Compare page | ComparePage | BaselineFilePrefix=mySSLogo<br>DifferenceFilePrefix=mySSLogoDiff<br>PageSaveFilePrefix=mySSLogoSave<br>IgnoreColor=#00FFFF |

FIG. 3

| Test Case | Enabled? | Platform | Layout | Baseline Script |
|---|---|---|---|---|
| TC001 | Y | Chrome | Large | WelcomeLayout |
| TC002 | Y | Chrome | Small | WelcomeLayout |
| TC003 | Y | Apple iPad Air | Landscape | WelcomeLayout |
| TC004 | Y | Apple iPad Air | Portrait | WelcomeLayout |
| TC005 | Y | Firefox | Large | BalancesCardLayout |
| TC006 | Y | Firefox | Medium | BalancesCardLayout |
| TC007 | Y | Samsung Galaxy | Landscape | BalancesCardLayout |

AUTOMATED QUALITY ASSURANCE TESTING OF BROWSER-BASED APPLICATIONS

TECHNICAL FIELD

This application relates generally to methods and apparatuses, including computer program products, for automated quality assurance testing of browser-based applications.

BACKGROUND

Today's computing devices, such as laptops, tablets, smartphones and the like, are available in a wide variety of hardware and software platforms each having different operational requirements. Most of these devices provide browser software to enable users to connect to the internet and access browser-based applications. Today's web applications typically require the same test cases to be performed on multiple platforms and layouts, where each test case must often have slight variances when performed on each platform. As a result, the ability for application developers to quickly and efficiently test such browser-based applications across the spectrum of platforms, without much (if any) manual tester involvement, has become important.

Current tools for automated functional testing of such browser-based applications are typically split into servicing different platforms (e.g., desktop computing vs. mobile computing)—often with different quality assurance teams handling each type of device. As a result, the teams may utilize many different test scripts to accommodate the different device platforms and, as the developers make changes to the application, the test scripts may require manual updates or adjustments for each platform to ensure the scripts are working properly. In addition, many test scripts cannot be reused or adapted to fit different platforms, as current testing tools are unable to dynamically recognize and test the same user interface controls across different browser software, device operating system software, and/or device hardware.

SUMMARY

Therefore, what is needed are methods and systems for automated quality assurance testing of browser-based applications that advantageously employs reusable baseline test scripts for a variety of different hardware and software platforms. The system can execute a baseline test script in a learning phase, in order to understand expected values for certain user interface components in a specific device platform and/or layout. The baseline test script contains a sequence of test steps applicable to multiple platforms and/or layouts, and has gaps for certain values relating to platform- or layout-specific user interface components. The system initiates the baseline test script, and when the system reaches a point in the baseline script with a gap as mentioned above, the system uses built-in intelligence to recognize patterns in the user interface components and extract expected values that are applicable to the specific platform or layout. The system can store the expected values in a repository for future use.

After the learning phase is complete, the system can enter a testing phase to execute the baseline test script against the same platform and/or layout. During the testing phase, the system executes the steps of the baseline test script and when the system reaches a point in the script with a gap, the system dynamically and seamlessly fills in the gap with the expected values determined previously. The system then verifies that the expected values for a user interface component match the actual values for that user interface component in the browser-based application being tested. If the actual values do not match the expected values, the system can issue a notification message indicating a test script failure.

Therefore, the methods and systems described herein provide the advantage of enabling quality assurance teams to reuse the same baseline test script for a variety of different device platforms and/or layouts both (i) to harvest for future use the expected user interface component values associated with each specific device platform and layout and (ii) to verify the expected user interface component values against the actual user interface component values for testing purposes.

The invention, in one aspect, features a computerized method for automated quality assurance testing of browser-based applications. A server computing device generates a baseline test script for a plurality of browser-based applications, where the baseline test script comprises a sequence of action steps having one or more empty user interface component values. The server computing device performs a first execution of the baseline test script in a learning mode against each of the plurality of browser-based applications to extract, for each browser-based application, one or more expected values associated with user interface components in the browser-based application that correspond to the empty user interface component values in the baseline test script. The server computing device stores the expected values for each of the browser-based applications in a repository. The server computing device performs a second execution of the baseline test script in a testing mode against each of the plurality of browser-based applications to extract, for each browser-based application, one or more actual values associated with user interface components in the browser-based application that correspond to the empty user interface component values in the baseline test script. The server computing device compares the actual values associated with user interface components in each browser-based application against the expected values associated with user interface components in the corresponding browser-based application. If one or more of the actual values does not match one or more of the expected values, the server computing device generates a notification message indicating a test failure and transmitting the notification message to a remote computing device.

The invention, in another aspect, features a system for automated quality assurance testing of browser-based applications. The system comprises a server computing device. The server computing device generates a baseline test script for a plurality of browser-based applications, where the baseline test script comprises a sequence of action steps having one or more empty user interface component values. The server computing device performs a first execution of the baseline test script in a learning mode against each of the plurality of browser-based applications to extract, for each browser-based application, one or more expected values associated with user interface components in the browser-based application that correspond to the empty user interface component values in the baseline test script. The server computing device stores the expected values for each of the browser-based applications in a repository. The server computing device performs a second execution of the baseline test script in a testing mode against each of the plurality of browser-based applications to extract, for each browser-based application, one or more actual values associated with user interface components in the browser-based application that correspond to the empty user interface component values in the baseline test script. The server computing device compares the actual values associated with user interface components in each browser-based application against the expected values associated with user interface components in the corresponding browser-based application. If one or more of the actual values does not match one or more of the expected values, the server computing device generates a notification message indicating a test failure and transmits the notification message to a remote computing device.

The invention, in another aspect, features a computer program product, tangibly embodied in a non-transitory computer readable storage device, for automated quality assurance testing of browser-based applications. The computer program product includes instructions operable to cause a server computing device to generate a baseline test script for a plurality of browser-based applications, where the baseline test script comprises a sequence of action steps having one or more empty user interface component values. The computer program product includes instructions operable to cause the server computing device to perform a first execution of the baseline test script in a learning mode against each of the plurality of browser-based applications to extract, for each browser-based application, one or more expected values associated with user interface components in the browser-based application that correspond to the empty user interface component values in the baseline test script. The computer program product includes instructions operable to cause the server computing device to store the expected values for each of the browser-based applications in a repository. The computer program product includes instructions operable to cause the server computing device to perform a second execution of the baseline test script in a testing mode against each of the plurality of browser-based applications to extract, for each browser-based application, one or more actual values associated with user interface components in the browser-based application that correspond to the empty user interface component values in the baseline test script. The computer program product includes instructions operable to cause the server computing device to compare the actual values associated with user interface components in each browser-based application against the expected values associated with user interface components in the corresponding browser-based application. If one or more of the actual values does not match one or more of the expected values, the computer program product includes instructions operable to cause the server computing device to generate a notification message indicating a test failure and transmit the notification message to a remote computing device.

Any of the above aspects can include one or more of the following features. In some embodiments, at least a portion of the plurality of browser-based applications comprises one or more different layouts for a single browser software platform. In some embodiments, at least a portion of the plurality of browser-based applications comprises one or more different browser software platforms executing on a single hardware platform.

In some embodiments, the expected values associated with user interface components comprise values corresponding to visual characteristics of the user interface components. In some embodiments, the expected values associated with user interface components comprise values corresponding to positional characteristics of the user interface components. In some embodiments, the expected values associated with user interface components comprise values corresponding to textual information within the user interface components.

In some embodiments, the first execution of the baseline test script is performed before the second execution of the baseline test script. In some embodiments, one or more of the browser-based applications comprise changed user interface components between the first execution of the baseline test script and the second execution of the baseline test script. In some embodiments, when performing the first execution of the baseline test script and reaching an action step having an empty user interface component value, the server computing device recognizes a pattern in the browser-based application and extracts the expected values based upon the recognized pattern.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
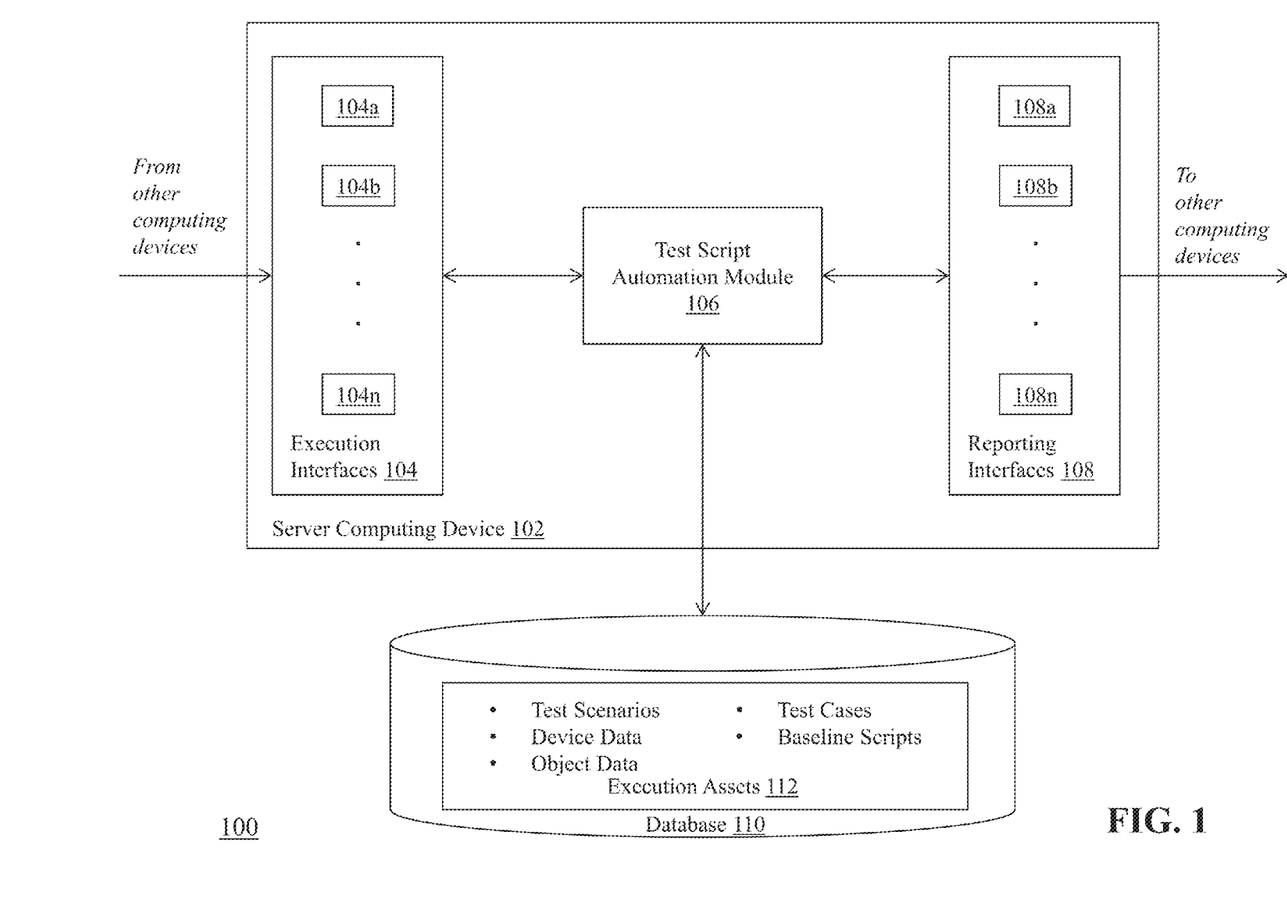
FIG. 1 is a block diagram of a system for automated quality assurance testing of browser-based applications.

FIG. 1 is a block diagram of a system 100 for automated quality assurance testing of browser-based applications. The system 100 includes a server computing device 102 with several computing modules and interfaces, including test execution interfaces 104a-104n (collectively, 104), a test script automation module 106, and reporting interfaces 108a-108n (collectively 108). The system 100 also includes a database 110 coupled to the server computing device 102 that contains execution assets 112 used for the purposes of automated quality assurance testing of browser-based applications as described herein.

The server computing device 102 is a combination of hardware and software modules that includes specialized hardware and/or software modules that execute on a processor and interact with memory modules of the server computing device 102, to receive data from the database 110, to transmit data to the database 110, to communicate with other computing devices (not shown) and to perform functions for automated quality assurance testing of browser-based applications as described herein. The server computing device 102 includes a test script automation module 106 and interfaces 104, 108 (as mentioned above) that execute on and/or interact with the processor of the server computing device 102.

In some embodiments, the test script automation module 106 and the interfaces 104, 108 are specialized sets of computer software instructions programmed onto one or more dedicated processors in the server computing device 102 and can include specifically-designated memory locations and/or registers for executing the specialized computer software instructions. Although the test script automation module 106 and the interfaces 104, 108 are shown in FIG. 1 as executing within the same server computing device 102, in some embodiments the functionality of the test script automation module 106 and the interfaces 104, 108 can be distributed among a plurality of server computing devices. As shown in FIG. 1, the server computing device 102 enables the test script automation module 106 and the interfaces 104, 108 to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the test script automation module 106 and the interfaces 104, 108 is described in detail below.

The execution interfaces 104 comprise programmatic interfaces for the test script automation module 106 to receive instructions from external software testing tools. Typically, the execution interfaces 104 are application programming interfaces (APIs) that enable an external software testing tool to communicate with the test script automation module 106 through the use of a defined set of commands, protocols, and routines. Exemplary execution interfaces include, but are not limited to, an API for a continuous integration and continuous delivery (CICD) tool (such as the Jenkins open source tool) and an API for a load measurement and simulation tool (such as the Load Runner testing tool available from Hewlett-Packard, Inc.) In some embodiments, an execution interface (e.g., interface 104a) can be a command-line interface enabling a user or other computing device to input commands directly to the module 106 without an intervening interface such as an API. It should be appreciated that the system 100 can include any number of execution interfaces 104 to integrate with the test script automation module 106.

The test script automation module 106 communicates with the interfaces 104, 108 of the server computing device 102 and the database 110 to provide functionality associated with automated quality assurance testing of browser-based applications as described herein. For example, the test script automation module 106 retrieves information from the database 110 to generate and execute baseline test scripts for a plurality of browser-based applications (including interfacing with the execution interfaces 104 during execution of the test scripts), compile the results from such tests and provide the test results to the reporting interfaces 108 for dissemination to and analysis by other computing devices. Further description regarding the functionality and operation of the test script automation module 106 will be provided below.

The reporting interfaces 108 comprise programmatic interfaces for the test script automation module 106 to transmit results from executed tests to other computing devices. Typically, the reporting interfaces 104 are application programming interfaces (APIs) that enable an external analysis and/or communications tool to communicate with the test script automation module 106 through the use of a defined set of commands, protocols, and routines. Exemplary reporting interfaces include, but are not limited to, an API for generating an output file (e.g., a log file), an API for connecting to a unit testing framework (such as xUnit), and so forth. It should be appreciated that the system 100 can include any number of reporting interfaces 108 to integrate with the test script automation module 106.

The database 110 is a computing device (or in some embodiments, a set of computing devices) coupled to the server computing device 102 and is configured to receive, generate, and store specific segments of data relating to the process of automated quality assurance testing of browser-based applications as described herein. In some embodiments, all or a portion of the database 110 can be integrated with the server computing device 102 or be located on a separate computing device or devices. The database 110 can comprise one or more databases configured to store portions of data used by the other components of the system 100, as will be described in greater detail below. An exemplary database 110 is MySQL™ available from Oracle Corp. of Redwood City, Calif.

The database 110 includes execution assets 112 such as test scenarios, device data, object data, test cases, and baseline test scripts to be used by the test script automation module 106 in generating and executing baseline test scripts for a plurality of browser-based applications. For example, the test scenarios can define setup parameters and other data to configure the test script automation module 106 for generation and execution of baseline test scripts. The device data including information that defines parameters for devices on which the plurality of browser-based applications run (e.g., smartphones, desktops, tablets, and so forth), so that when the test script automation module 106 executes the baseline test script for a particular device, the module 106 loads in applicable device settings and operational parameters. The test cases define a listing of baseline test scripts to be executed against specific device platforms/layouts. The object data relates to user interface components contained in the browser-based application to be tested.

It should be appreciated that the components of the system 100 can be configured to communicate via a communication network (not shown) in order to exchange information as described herein. The network may be a local network, such as a LAN, or a wide area network, such as the Internet. The network may communicate via a packet-based protocol (e.g., IP). In some embodiments, the network is comprised of several discrete networks and/or sub-networks (including related routing, load balancing, and traffic metering hardware).

Figure 2:
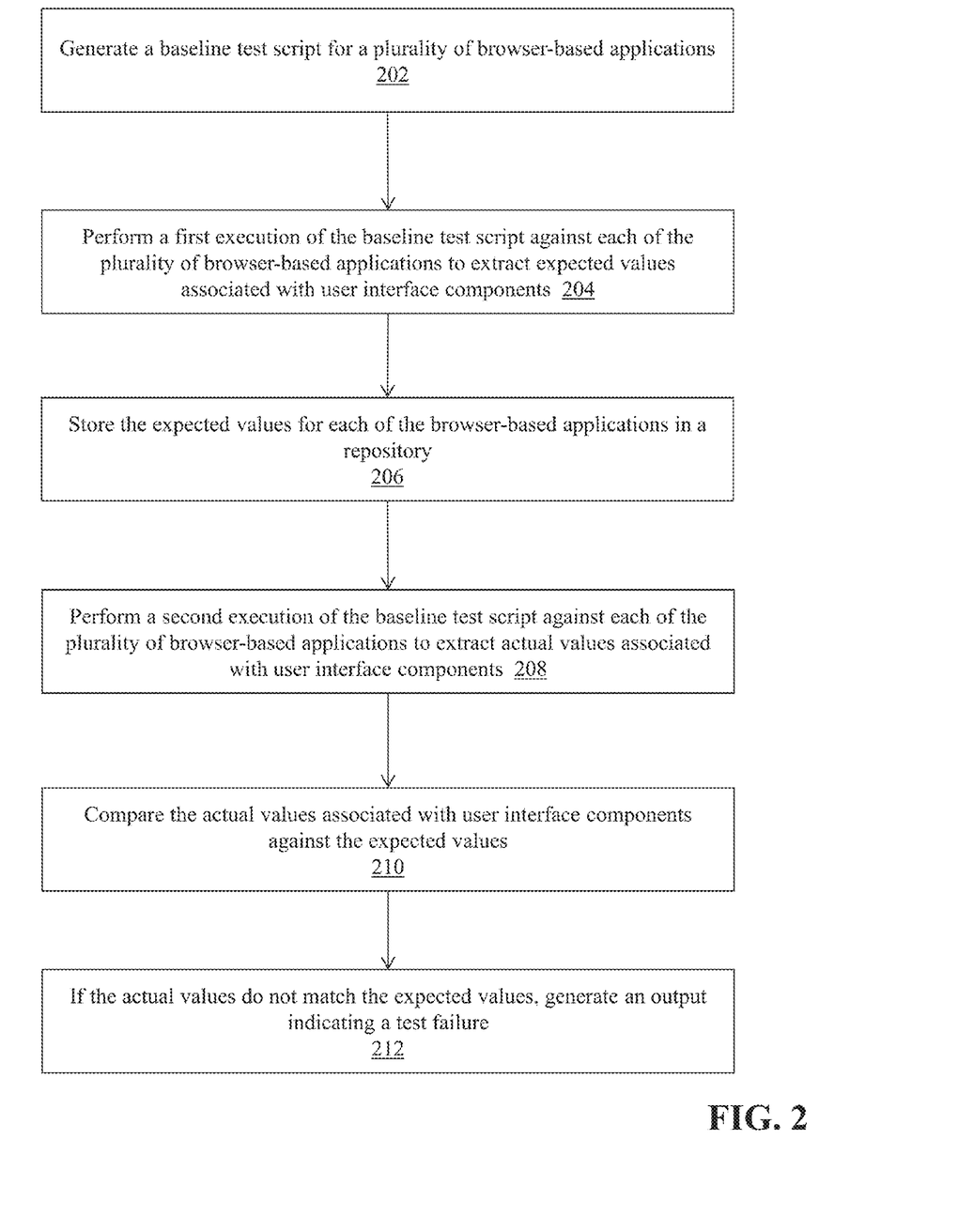
FIG. 2 is a flow diagram of a method for automated quality assurance testing of browser-based applications.

FIG. 2 is a flow diagram of a method 200 for automated quality assurance testing of browser-based applications, using the system 100 of FIG. 1. The test script automation module 106 generates (202) a baseline test script for a plurality of browser-based applications. The baseline test script comprises a sequence of action steps to be performed by the test script automation module 106 during the test. To generate the baseline test script, the test script automation module 106 can retrieve execution assets 112 from the database 110 for devices and objects to be tested, and test cases to be performed and aggregate the assets 112 together into the test script. In some embodiments, the module 106 can retrieve an already-existing baseline test script from the database 110. An example test script is provided in FIG. 3.

Figure 3:
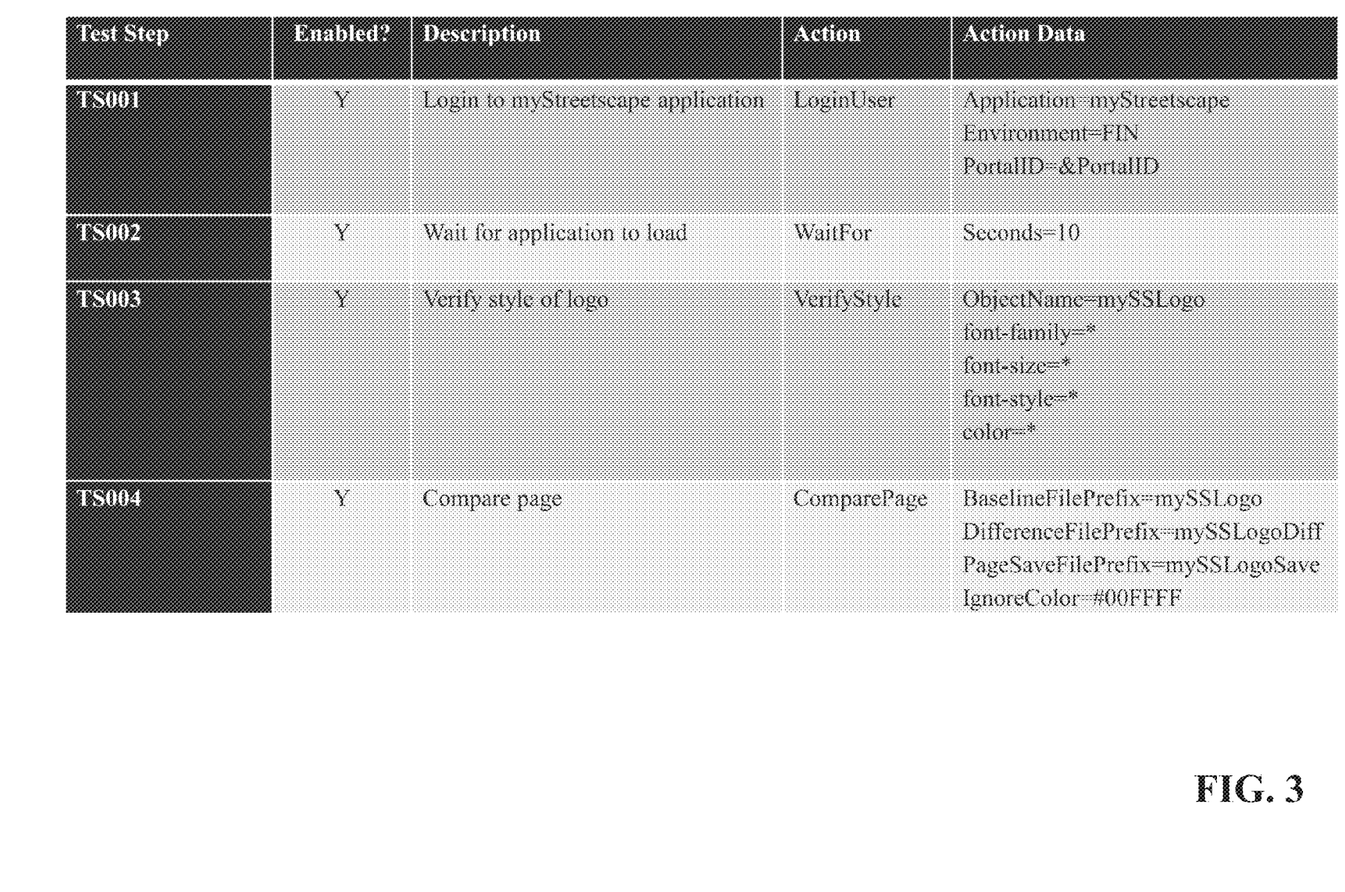
FIG. 3 is an exemplary baseline test script.

As shown in FIG. 3, the test script includes a plurality of steps (e.g., TS001, TS002, etc.) with corresponding actions (e.g., LoginUser, WaitFor, VerifyStyle, etc.) to be performed by the test script automation module 106. Each test step also includes action data that consists of variables and other parameters to be used as input to the test script for the corresponding step. For example, test step TS001 includes action data of "Application=myStreetscape;" "Environment=FIN;" and "PortalID=&PortalID;" where the first element in each piece of action data is the variable name and the second element is the variable value.

For certain test steps, the action data includes an asterisk in the variable value slot which indicates an empty value for a corresponding user interface component in the browser-based application. As shown in FIG. 3, test step TS003 corresponds to the action of VerifyStyle and includes the following action data: "ObjectName=mySSLogo;" "font-family=*;" "font-size=*;" "font-style=*;" and color=*." When the test script automation module 106 executes this step, the module 106 analyzes the style (e.g., CSS) of a corresponding user interface element (in this case, a page or view) in the browser-based application to determine values for specific style elements, like font-family, font-size, font-style, and color. Because those style elements are assigned an asterisk in the baseline test script, the values for those style elements are considered empty for the purposes of testing the browser-based application, as will be explained below.

Once the baseline test script has been generated and is ready for execution, the test script automation module 106 performs (204) a first execution of the baseline test script against each of the plurality of browser-based applications. For example, the module 106 may be configured to test several different device platforms and/or layouts in the same testing session. An example platform may be a browser type (e.g., Chrome, Firefox, Safari, Edge, Internet Explorer), a device operating system type (e.g., Apple iOS, Android), a device type (e.g., Apple iPad, Samsung Galaxy), combinations of these, and the like. An example layout may be portrait or landscape (for certain mobile devices) and/or large, medium, or small (for PC-based browser software). For example, the module 106 can be configured to test an application rendered in a Chrome browser on a desktop computer in each of large, medium, and small layouts as well as testing an application rendered in the Safari browser software on an iPad Air in both landscape and portrait layouts.

Figure 4:
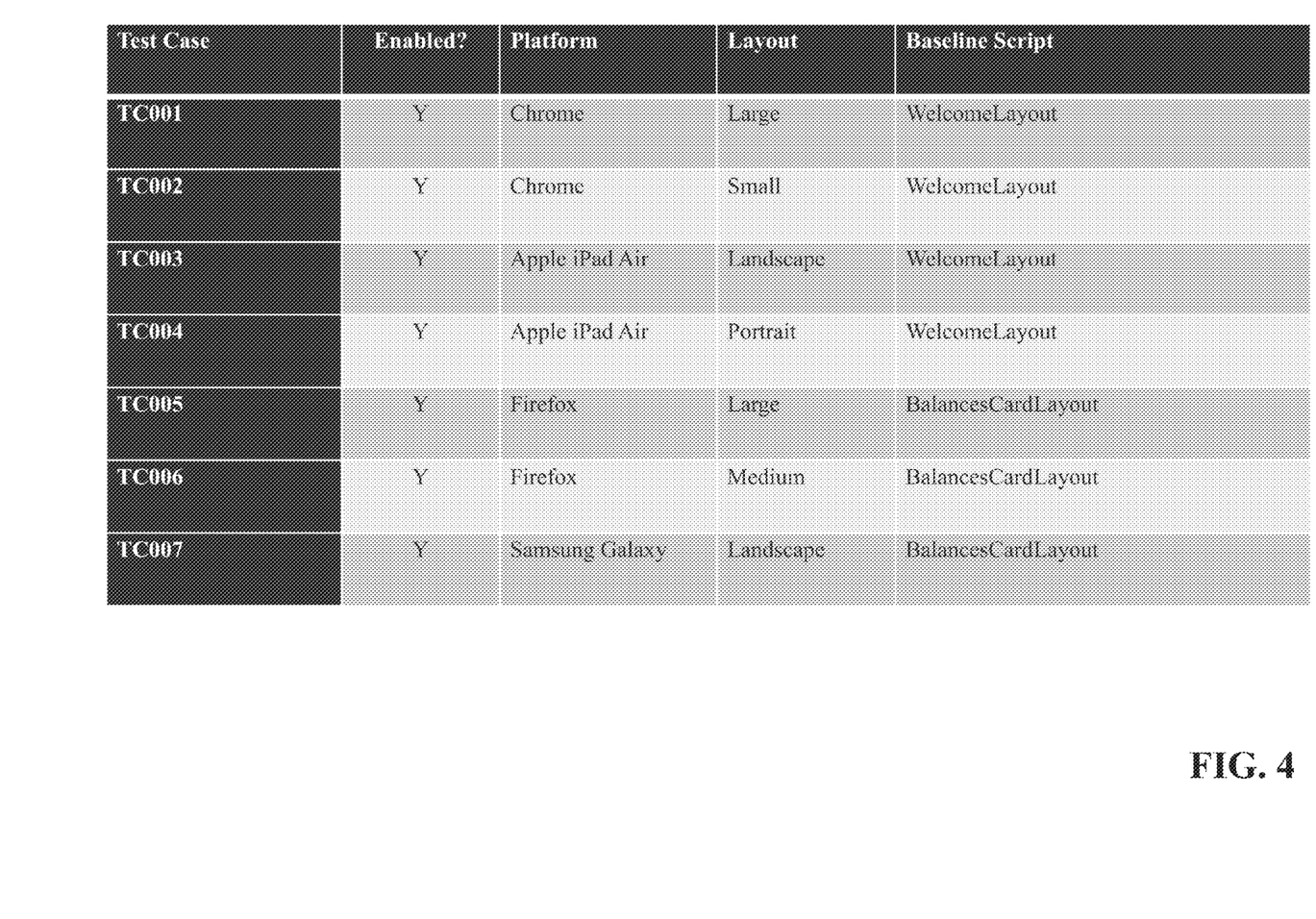
FIG. 4 is an exemplary list of test cases.

FIG. 4 is an exemplary list of test cases that the module 106 can be configured to perform. As shown in FIG. 4, each of the test cases (TC001 to TC005) corresponds to a specific platform and layout to be tested, and each test case invokes a specific baseline test script (e.g., WelcomeLayout, BalancesCardLayout).

The first execution of the baseline test script is performed in a learning mode—meaning that the test script automation module 106 performs the test steps against each browser-based application in order to extract user interface component values from the application that correspond to the empty user interface component values in the baseline script. The module 106 can use the extracted values for subsequent testing and validation of the browser-based application. In learning mode, the browser-based application that the module 106 is testing is considered as the expected or intended version, with correct values for the user interface components contained therein. Therefore, the module 106 can extract these correct values and store them as expected values for subsequent executions of the baseline script against different versions of the application (i.e., as development continues or as the underlying browser software/device hardware changes, the user interface components in the application may change).

Using the baseline test script in FIG. 3, when the module 106 reaches the VerifyStyle step TS003, the module 106 determines that it should verify the style for the mySSLogo user interface component and sees that the font-family, font-size, font-style, and color elements are empty. In learning mode, the module 106 analyzes the browser-based application to determine current values for the font-family, font-size, font-style, and color elements in the mySSLogo user interface component in the browser-based application for each platform/layout being tested.

In one embodiment, the module 106 can analyze the attributes of the mySSLogo UIC embedded in the web page loaded into a Chrome browser in a small layout by the previous test steps TS001 and TS002. The module 106 extracts the expected values for the above-referenced style elements of the mySSLogo UIC (e.g., font-family: arial; font-size: 12 px; font-style: bold; color: green). The module 106 stores (206) the expected values in database 110.

Then, the module 106 can continue on to the next test case (e.g., Apple iPad Air in portrait layout) to extract expected values for the same style elements of the mySSLogo UIC. For example, the mySSLogo UIC may have expected values of font-family: courier; font-size: 14 px; font-style: italic; color: blue on the Apple iPad Air platform—which differ from those for the Chrome browser on a desktop computer. The module 106 stores the expected values for each platform/layout in database 110.

After executing the steps of the baseline test script and learning the expected values for user interface components in the browser-based applications, the test script automation module 106 performs (208) a second execution of the baseline test script against each of the plurality of browser-based applications (e.g., platforms/layouts). This time, however, the test script automation module 106 is executing the script in a testing mode—the browser-based applications being analyzed by the module 106 are not the expected or intended versions, but instead may be actual production or developmental versions of the applications that have been subject to changes (and thus require quality assurance testing to confirm that the user interface components are rendered according to the desired characteristics).

During the testing mode, the module 106 performs the test steps in the baseline test script against each browser-based application to extract actual values for the user interface components where the actual values correspond to the empty user interface component values as described previously. Using the baseline test script of FIG. 3, when the module 106 reaches the VerifyStyle step TS003, the module 106 determines that it should verify the style for the mySSLogo user interface component and sees that the font-family, font-size, font-style, and color elements are empty. In testing mode, the module 106 analyzes the browser-based application to determine actual values for the font-family, font-size, font-style, and color elements in the mySSLogo user interface component in the browser-based application. For example, the actual values for the mySSLogo component as detected by the module 106 for an application running in a Chrome browser on a desktop computer may be font-family: arial; font-size: 16 px; font-style: bold; color: green. The module 106 also retrieves the expected values for the same user interface component elements (and corresponding platform/layout) from database 110.

The test script automation module 106 then compares (210) the actual values against the expected values to determine whether any discrepancies or differences exist. Continuing the above example, the actual value of font-size (i.e., 16 px) is larger than the expected value (i.e., 12 px) that the module 106 had learned previously. This indicates that the latter version of the application contains an error that needs to be corrected.

If one or more of the actual values do not match one or more of the corresponding expected values, the test script automation module 106 generates (212) an output indicating a test failure. The module 106 communicates with the appropriate reporting interface(s) 108 to transmit the test output for further review and action.

In some embodiments, the output comprises a notification message to a remote computing device that contains relevant details of the test failure (e.g., platform, layout, test step, test script, user interface component, expected value, actual value, build number, etc.). In some embodiments, the output comprises a log file or similar test result summary (e.g., generated in HTML format) that a QA analyst can review. In some embodiments, the output is a command sent by the module 106 to a reporting interface (e.g., 108b) that connects to a remote testing tool which can receive the test output for analysis.

Due to the advantage provided by dynamically inserting user interface component values in the baseline test script, the test script automation module 106 can utilize the same baseline test script for each of the plurality of browser-based applications, platforms, and layouts without requiring manual loading of values or creation of a different test script for each of the various platforms and layouts. In addition, by executing the learning mode as described above, the test script automation module 106 can extract and store specific user interface component values for UICs in a range of different platforms and layouts—while using the same baseline test script for each. In this way, the system 100 simply needs to validate current values for each of the user interface components it is testing against expected values it has previously learned—which results in a more efficient, streamlined and simple automated testing procedure.

It should be appreciated that the methods and systems described herein can be used to automate the testing and validation of a wide variety of different user interface components in browser-based applications, including items like the position and orientation of a group of user interface components on a screen. One example of such user a group is a series of widgets (or cards) arranged in an application that each displays a different piece of information that is related in context to the information in the other cards. For example, each card may display a different type of information that relates to an account balance for a user of the browser-based application.

In some platforms and/or layouts, the user interface may be big enough to display a grid of cards having three columns. However, in other platforms/layouts, the user interface may be big enough to only display a grid of cards having two columns (or even one column). The system 100 described above can be configured to execute a baseline test script to both (i) learn the expected position and orientation of these user interface components in various platforms/layouts and (ii) test the actual position and orientation of the user interface components to determine whether the application encounters any problems in displaying the user interface components.

Figure 5A:
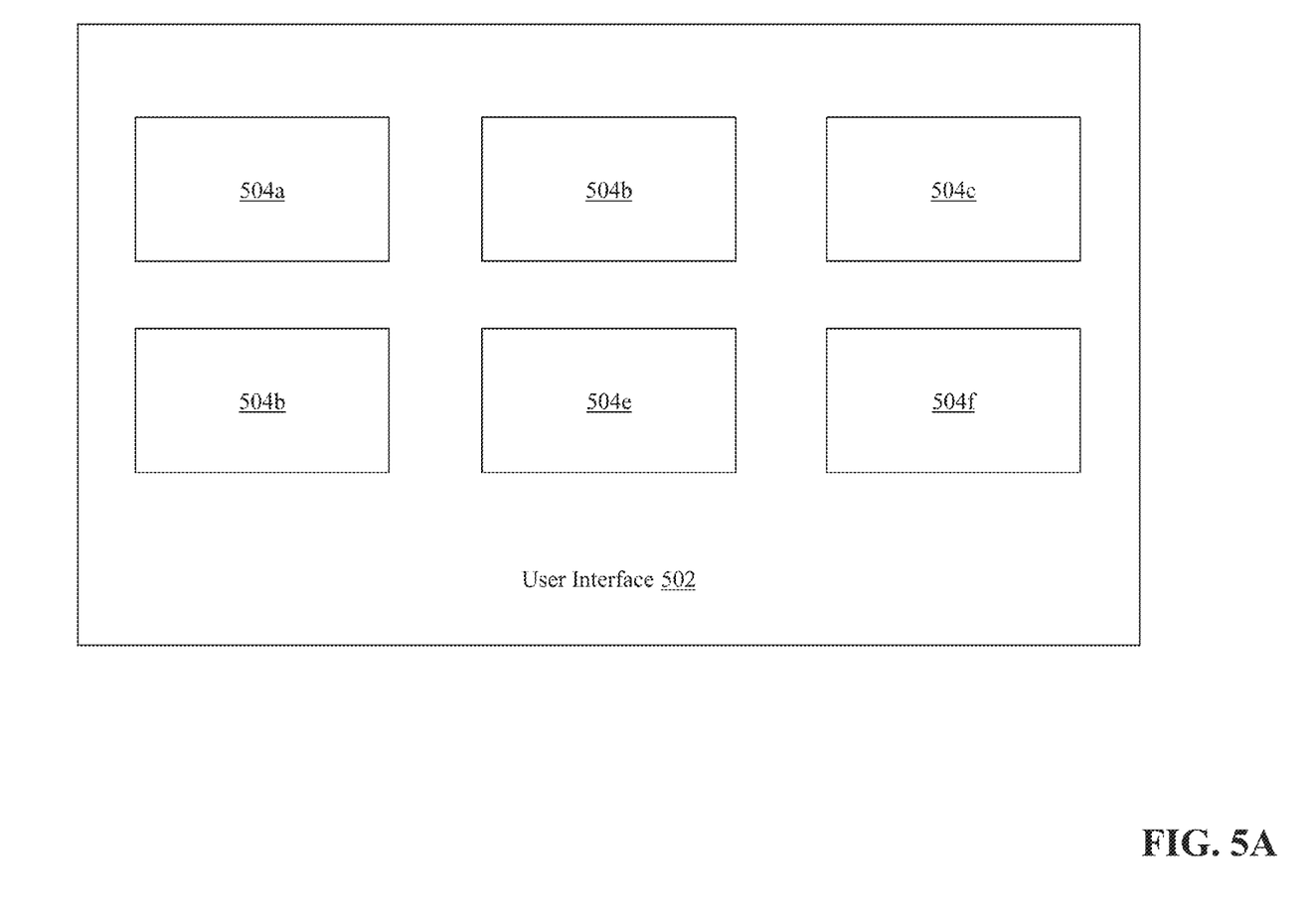
FIGS. 5A-5C are exemplary user interfaces displaying a grid of user interface components in varying arrangements.

FIG. 5A is an exemplary user interface layout for a browser-based application that shows six user interface components 504a-504f arranged in a three-by-two grid. In this example, the test script automation module 106 can execute a baseline test script in learning mode to extract the position of each user interface component 504a-504f as well as the configuration of the components (e.g., three-by-two). For example, the baseline test script can include a step to verify the position of each component 504a-504f which contains empty values (e.g., asterisks) for the position values. When the module 106 executes the script in learning mode, the module 106 analyzes the application to extract the position values (e.g., x-y coordinates) for each user interface component 504a-504f and store those position values in database 110.

The baseline test script may also include a step to verify the number of columns and total number of user interface components in the arrangement, where the script contains empty values for the number of columns and for the total number of user interface components. When the module 106 executes the script in learning mode, the module 106 analyzes the application to extract the number of columns (e.g., three) and the total number of user interface components 504a-504f (e.g., six) and store those values in database 110.

Later, the test script automation module 106 executes the baseline test script against a production version of the browser-based application, the module 106 extracts actual values for the positions of each of the UICs 504a-504f, and for the number of columns and total number of UICs. If any of the actual values differs from the expected values (e.g., the production application includes four columns or the actual position of user interfaces component 504c is different from the expected position), the module 106 can indicate a test failure as described previously.

Figure 5B:
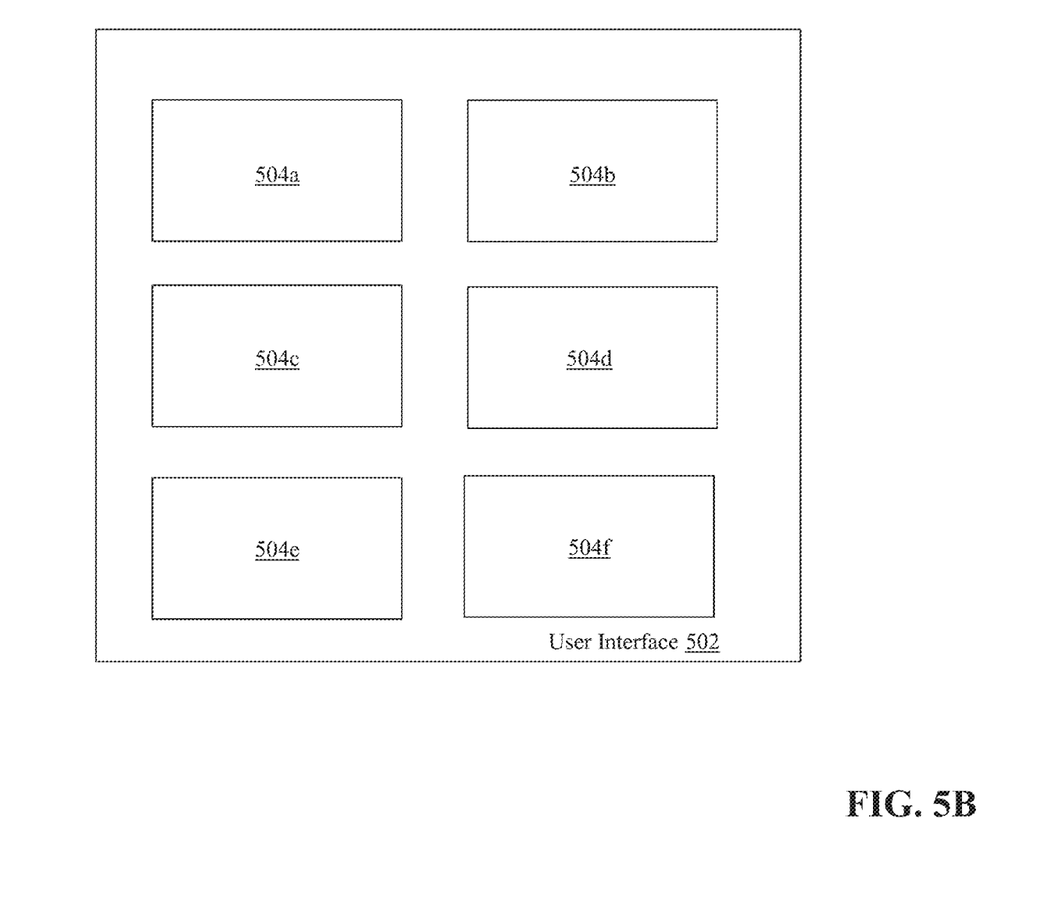
Figure 5C:
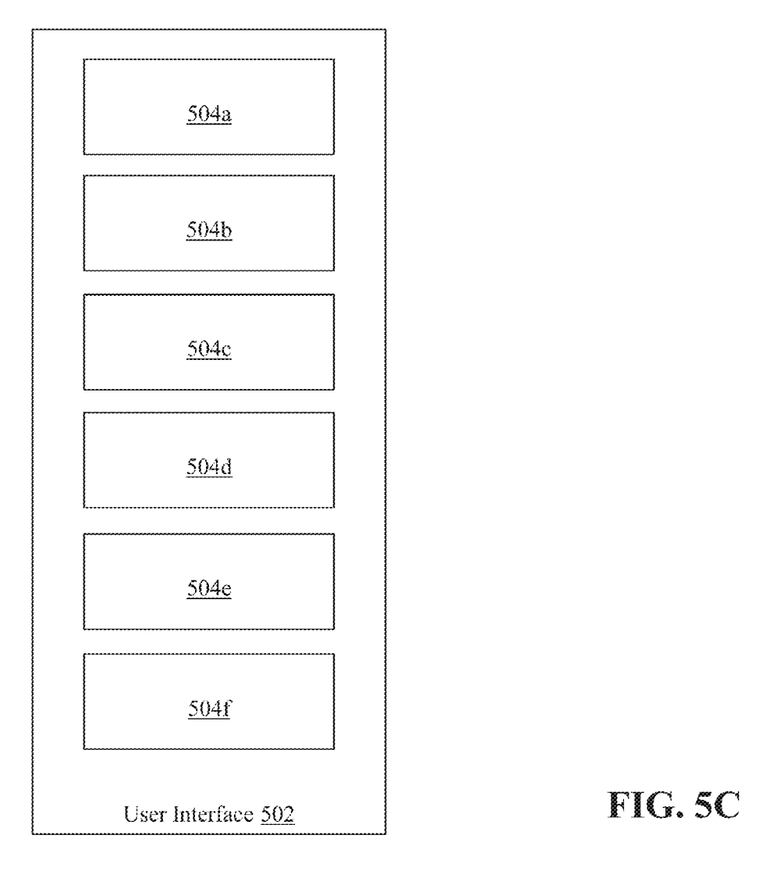

Because different device platforms and layouts result in different-sized user interfaces, the system 100 is capable of learning positions and arrangement of user interface components for each of the various platforms and layouts. FIGS. 5B and 5C are exemplary user interface layouts for a browser-based application that show the same six user interface components 504a-504f that appear in FIG. 5A, but arranged in different layouts based upon the size of the user interface. For example, in FIG. 5B, the grid of user interface components 504a-504f is arranged in a two-by-three pattern, while in FIG. 5C, the grid of user interface components 504a-504f is arranged in a one-by-six pattern. It should be appreciated that any number of different layouts (including custom layouts) can be learned, stored and verified by the system 100 according to the techniques described herein.

Also, the system 100 can learn and verify the appearance and/or absence of specific user interface components according to custom views established by users of the browser-based applications. For example, one user may want to see only components 504a and 504c, while another user may want to see components 504a, 504b, 504e, and 504f. The system 100 can verify layouts on a user- and/or account-specific basis.

Another way in which the techniques described herein can be leveraged is in the testing and validation of fillable forms in browser-based applications. For example, the test script automation module 106 can be configured to execute a baseline test script that analyzes input entered into certain user interface components (e.g., text fields, drop-down boxes, etc.) and compares the entered input against expected input to determine whether the browser-based application is functioning correctly.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for automated quality assurance testing of browser-based applications, the method comprising:
generating, by a server computing device, a baseline test script for a plurality of browser-based applications, wherein the baseline test script comprises a sequence of action steps having one or more empty user interface component attribute values;
performing, by the server computing device, a first execution of the baseline test script in a learning mode against an intended version of each of the plurality of browser-based applications to extract, for the intended version of each browser-based application, one or more expected attribute values associated with user interface components in the intended version of the browser-based application that correspond to the empty user interface component attribute values in the baseline test script, the expected attribute values extracted from a code file of a webpage in the intended version of the browser-based application in which the user interface component is located;
storing, by the server computing device, the expected attribute values for each intended version of the browser-based applications in a repository;
performing, by the server computing device, a second execution of the baseline test script in a testing mode against an in-development version of each of the plurality of browser-based applications to extract, for each in-development version of the browser-based application, one or more actual attribute values associated with user interface components in the in-development version of the browser-based application that correspond to the empty user interface component attribute values in the baseline test script, the actual attribute values extracted from a code file of a webpage in the in-development version of the browser-based application in which the user interface component is located;
comparing, by the server computing device, the actual attribute values associated with user interface components in the in-development version of each browser-based application against the corresponding expected attribute values associated with user interface components in the intended version of the browser-based application; and
if one or more of the actual attribute values does not match one or more of the expected attribute values, generating, by the server computing device, a notification message indicating a test failure and transmitting the notification message to a remote computing device.

2. The method of claim 1, wherein at least a portion of the intended version of the plurality of browser-based applications and at least a portion of the in-development version of the plurality of browser-based applications comprise one or more different layouts for a single browser software platform.

3. The method of claim 1, wherein at least a portion of the intended version of the plurality of browser-based applications and at least a portion of the in-development version of the plurality of browser-based applications comprise one or more different browser software platforms executing on a single hardware platform.

4. The method of claim 1, wherein the expected attribute values associated with user interface components comprise values corresponding to visual characteristics of the user interface components.

5. The method of claim 1, wherein the expected attribute values associated with user interface components comprise values corresponding to positional characteristics of the user interface components.

6. The method of claim 1, wherein the expected attribute values associated with user interface components comprise values associated with textual information within the user interface components.

7. The method of claim 1, wherein the first execution of the baseline test script is performed before the second execution of the baseline test script.

8. The method of claim 1, wherein when performing the first execution of the baseline test script and reaching an action step having an empty user interface component value, the server computing device recognizes a pattern in the code file of the webpage in the intended version of the browser-based application in which the user interface component is located and extracts the expected attribute values based upon the recognized pattern.

9. A system for automated quality assurance testing of browser-based applications, the system comprising a server computing device configured to:
generate a baseline test script for a plurality of browser-based applications, wherein the baseline test script comprises a sequence of action steps having one or more empty user interface component attribute values;
perform a first execution of the baseline test script in a learning mode against an intended version of each of the plurality of browser-based applications to extract, for the intended version of each browser-based application, one or more expected attribute values associated with user interface components in the intended version of the browser-based application that correspond to the empty user interface component attribute values in the baseline test script, the expected attribute values extracted from a code file of a webpage in the intended version of the browser-based application in which the user interface component is located;
store the expected attribute values for each intended version of the browser-based applications in a repository;
perform a second execution of the baseline test script in a testing mode against an in-development version of each of the plurality of browser-based applications to extract, for each in-development version of the browser-based application, one or more actual attribute values associated with user interface components in the in-development version of the browser-based application that correspond to the empty user interface component attribute values in the baseline test script, the actual attribute values extracted from a code file of a webpage in the in-development version of the browser-based application in which the user interface component is located;
compare the actual attribute values associated with user interface components in the in-development version of each browser-based application against the corresponding expected attribute values associated with user interface components in the intended version of the browser-based application; and
if one or more of the actual attribute values does not match one or more of the expected attribute values, generate a notification message indicating a test failure and transmitting the notification message to a remote computing device.

10. The system of claim 9, wherein at least a portion of the intended version of the plurality of browser-based applications and at least a portion of the in-development version of the plurality of browser-based applications comprise one or more different browser software platforms executing on a single hardware platform.

11. The system of claim 9, wherein at least a portion of the intended version of the plurality of browser-based applications and at least a portion of the in-development version of the plurality of browser-based applications comprise one or more different browser software platforms executing on a single hardware platform.

12. The system of claim 9, wherein the expected attribute values associated with user interface components comprise values corresponding to visual characteristics of the user interface components.

13. The system of claim 9, wherein the expected attribute values associated with user interface components comprise values corresponding to positional characteristics of the user interface components.

14. The system of claim 9, wherein the expected attribute values associated with user interface components comprise values associated with textual information within the user interface components.

15. The system of claim 9, wherein the first execution of the baseline test script is performed before the second execution of the baseline test script.

16. The system of claim 9, wherein when performing the first execution of the baseline test script and reaching an action step having an empty user interface component value, the server computing device recognizes a pattern code file of the webpage in the intended version of the browser-based application in which the user interface component is located and extracts the expected attribute values based upon the recognized pattern.

17. A computer program product, tangibly embodied in a non-transitory computer readable storage device, for automated quality assurance testing of browser-based applications, the computer program product including instructions that, when executed, cause a server computing device to:
   generate a baseline test script for a plurality of browser-based applications, wherein the baseline test script comprises a sequence of action steps having one or more empty user interface component attribute values;
   perform a first execution of the baseline test script in a learning mode against an intended version of each of the plurality of browser-based applications to extract, for the intended version of each browser-based application, one or more expected attribute values associated with user interface components in the intended version of the browser-based application that correspond to the empty user interface component attribute values in the baseline test script, the expected attribute values extracted from a code file of a webpage in the intended version of the browser-based application in which the user interface component is located;
   store the expected attribute values for each intended version of the browser-based applications in a repository;
   perform a second execution of the baseline test script in a testing mode against an in-development version of each of the plurality of browser-based applications to extract, for each in-development version of the browser-based application, one or more actual attribute values associated with user interface components in the in-development version of the browser-based application that correspond to the empty user interface component attribute values in the baseline test script, the actual attribute values extracted from a code file of a webpage in the in-development version of the browser-based application in which the user interface component is located;
   compare the actual attribute values associated with user interface components in the in-development version of each browser-based application against the corresponding expected attribute values associated with user interface components in the intended version of the browser-based application; and
   if one or more of the actual attribute values does not match one or more of the expected attribute values, generate a notification message indicating a test failure and transmitting the notification message to a remote computing device.

18. The method of claim 1, wherein the code file associated with the webpage in the intended version of the browser-based application in which the user interface component is located comprises a CSS file.

19. The method of claim 1, wherein the code file associated with the webpage in the intended version of the browser-based application in which the user interface component is located comprises an HTML file.

* * * * *